United States Patent

[11] 3,602,394

| [72] | Inventor | Thomas F. McCune<br>Cloverdale, Va. 24077 |
|------|----------|-------------------------------------------|
| [21] | Appl. No. | 837,160 |
| [22] | Filed | June 27, 1969 |
| [45] | Patented | Aug. 31, 1971 |

[54] DISPENSER FOR SILAGE ADDITIVE
11 Claims, 5 Drawing Figs.

[52] U.S. Cl. .................................................. 222/43,
222/240, 222/352, 239/142, 239/683, 302/56
[51] Int. Cl. ................................................. B67d 5/22
[50] Field of Search........................................... 222/228,
240, 241, 242, 352, 43; 239/142, 681, 683, 687;
302/56

[56] References Cited
UNITED STATES PATENTS
795,031   7/1905   Ebling.......................... 222/240

| 1,150,310 | 8/1915 | Sims........................... | 222/352 |
| 1,457,038 | 5/1923 | Lane et al..................... | 222/352 X |
| 2,882,060 | 4/1959 | Speicher....................... | 239/687 |
| 3,383,055 | 5/1968 | Speicher....................... | 239/687 |

*Primary Examiner*—M. Henson Wood, Jr.
*Assistant Examiner*—Michael Y. Mar
*Attorneys*—Clarence A O'Brien and Harvey B. Jacobson ABSTRACT: A conical hopper supported with the small lower end in overlying relation to a flow path of conveyed silage with a motor powered shaft oriented vertically therein and a horizontal plate having predetermined size openings therein forming a gate for the lower end of a hopper. The shaft is provided with agitating rods and an axially extending brush arrangement in overlying engagement with the lower end of the hopper in engagement with the bottom surface of the hopper to retain the discharge aperture therein free of material to avoid clogging.

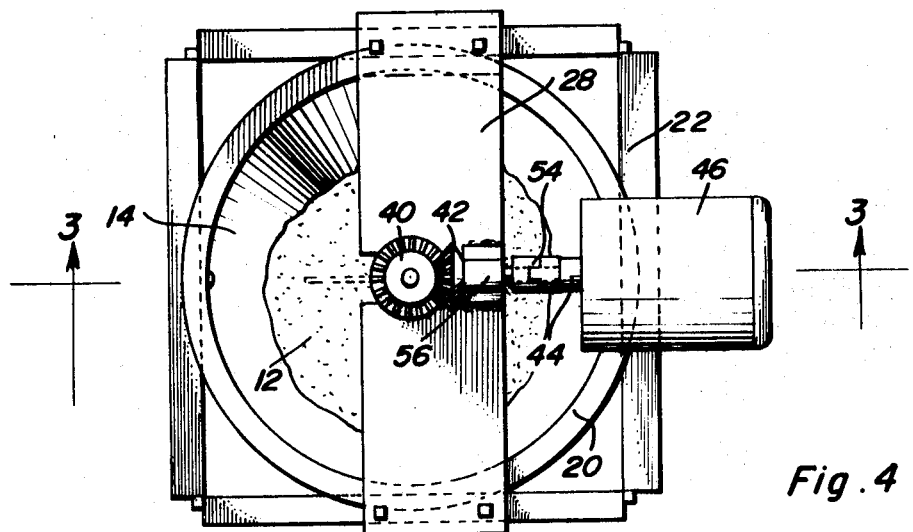
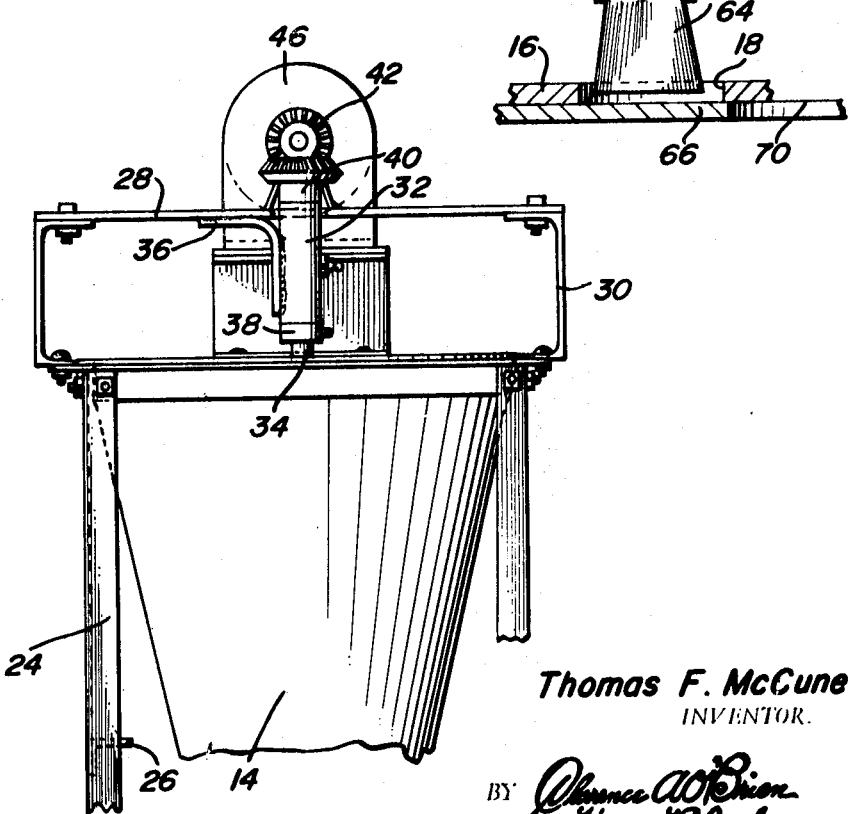

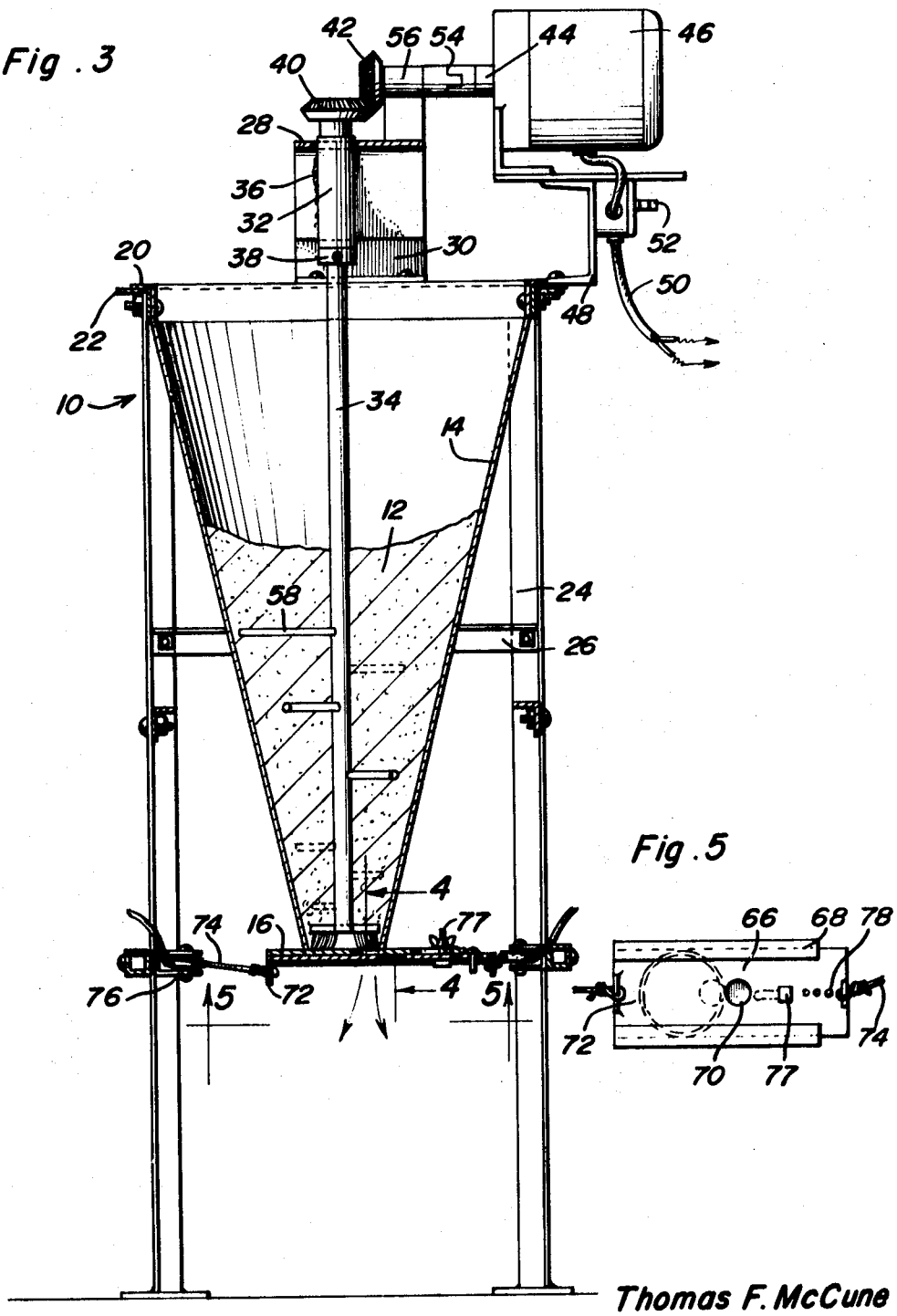

3,602,394

DISPENSER FOR SILAGE ADDITIVE

BACKGROUND OF THE INVENTION

The present invention generally relates to introduction of additive materials to ensilage prior to its being deposited into a storage area such as a silo or the like and more particularly to a dispenser for such additives which enables an accurate predetermined quantity of additive to be dispensed at an even rate into the ensilage so that a substantially homogeneous mixture of ensilage and additive will be deposited into the silo or the like.

Previously, additives have been provided for mixing with ensilage prior to the ensilage being placed in a silo or other similar storage area. Generally, the additive has been manually deposited in the ensilage during a conveying operation or the like which resulted in uneven distribution of the additive in the ensilage and in addition required the expenditure of time and effort to manually throw the additive into the ensilage by using a shovel, scoop, hand or the like. Ensilage is present-day operations usually is chopped in the field by a chopper and discharged into a wagon box or other similar load body and when filled, the wagon box is moved to a position alongside the silo where the silage is conveyed into the silo by a conveyor and in the event of the silo being a cylindrical structure above ground, a blower is usually provided for conveying the silage into the silo. In order to manually add the additive, a person usually manually places the additive on the silage while it was being conveyed into the blower. Inasmuch as only a relatively small quantity of additive is necessary, this operation was quite frequently carried out by a person merely using his hand as a scoop to throw the additive onto the silage. For example, 1½ to 2 pounds of additive are added to each ton of silage and in most operations, a ton of silage can be unloaded and discharged into the silo in approximately 3 to 4 minutes thus requiring the constant attention of the person to place the additive on the silage. Inasmuch as the additive is a granular material, substantial losses of the additive occurs and there is also some danger of injury to the person manually placing the additive on the silage.

SUMMARY OF THE INVENTION

It is an object of the present invention to provide a dispenser for the granular or pulverant silage additive which automatically discharges a predetermined quantity of additive substantially uniformly in the silage as it is being conveyed, prior to discharge into a silo or other storage area with the dispenser capable of being supported in overlying relation to a conveyor which feeds the blower or associated with a silage chopper in the field to introduce the additive into the silage while it is being conveyed into the chopper.

Another object of the invention is to provide a dispenser including a vertically disposed conical hopper with a vertical shaft supported therein and provided with spaced radial agitating rods with the shaft being driven by a suitable motor at a relatively slow speed for maintaining the additive material in a free flowing condition.

Another very significant object of the invention is to provide a dispenser in accordance with the preceding object in which the vertical shaft is provided with a diametrically and axially extending wire brush across the lower free end thereof in engagement with an apertured bottom plate in the hopper for maintaining the plate clean and retaining the aperture therein free of material to prevent clogging thereof.

Still another object of the invention is to provide a dispenser in accordance with the preceding objects including a slide plate or gate having a plurality of apertures therein of predetermined size to vary the quantity of additive material discharged in a given time period to enable variation in the quantity of material added to the silage.

A still further object of the invention is to provide a dispenser for silage additive which is relatively simple in construction, effective for his purposes and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the dispenser for silage additives.

FIG. 2 is a side elevational view of the upper end portion of the dispenser.

FIG. 3 is a vertical sectional view taken substantially upon a plane passing along section line 3—3 of FIG. 1 illustrating the structural details of the dispenser.

FIG. 4 is a detailed sectional view taken substantially upon a plane and passing along section line 4—4 of FIG. 3, on an enlarged scale, illustrating the specific construction of the wire brush and its association with the apertured bottom plate in the hopper.

FIG. 5 is a bottom plan view taken substantially along reference line 5—5 of FIG. 3 illustrating further structural details of the slidable gate for controlling discharge of material from the dispenser.

DESCRIPTION OF THE PREFERRED EMBODIMENT

Referring now specifically to the drawings, the dispenser of the present invention is generally designated by the numeral 10 and is employed for dispensing commercially available silage additive 12 which is available in a granular or powder form and serves to enhance the quality of the silage in a manner well known in the art.

The dispenser 10 includes a vertically oriented substantially conical hopper 14 receiving the additive material 12 with the hopper 14 including an open upper end to enable the additive material to be placed therein. The lower end of the hopper 14 is provided with a bottom plate 16 having a discharge opening 18 therein which is oriented in offset relation to the center thereof. The bottom plate 16 may be integral with the peripheral wall of the hopper or rigidly affixed thereto in any suitable manner. The upper end of the hopper 14 includes a peripheral flange 20 supported from a supporting frame 22 of any suitable construction such as angle iron members or the like. The frame 22 is attached to and supported by a plurality of vertical supporting members 24 interconnected by horizontal brace members 26 to define a supporting stand for the hopper.

Extending diametrically of the open upper end of the hopper in spaced parallel relation thereto is a supporting plate 28 supported by brackets 30 extending downwardly and attached to the frame 22 in any suitable manner. Supported centrally in the plate 28 is a bearing sleeve 32 journaling a vertical shaft 34 therein. The sleeve 32 is supported from the plate 28 by a suitable L-shaped bracket 36 and the shaft 34 has a collar 38 thereon engaging the lower end of the sleeve 32 and the upper end of the shaft is provided with a bevel gear 40 which extends above the plate 38 and is in meshing engagement with a bevel gear 42 carried by an output shaft 44 on a motor and reduction gear drive unit 46. The reduction gear and drive motor unit 46 is supported by a bracket structure 48 carried by the frame 22 and is connected to a source of electrical energy through a conductor assembly 50 with a suitable switch 52 being provided for controlling operation of the motor. The drive shaft 44 is provided with a suitable coupling 54 therein and the outer end thereof is journaled in a bearing 56 so that the bevel gears 42 and 40 will be properly oriented in meshing relationship. When the switch 52 is closed and the motor connected to the source of electrical energy, the motor and reduction gear unit 46 will be actuated thus rotating the shaft 34 at a relatively slow rate of speed inasmuch as the additive material tends to form balls if agitated rapidly.

Mounted on the shaft 34 is a plurality of vertically spaced, radially extending agitating rods 58 which are staggered around the periphery of the shaft 34 and have a length so that they terminate adjacent the inner surface of the hopper 14 for slowly agitating the material 12 to assure free flowing characteristics thereof and preventing the material 12 from bridging across the hopper. The lower end of the shaft 34 is provided with a transversely extending wire brush assembly generally designated by the numeral 60 which includes an axially opening U-shaped member 62 rigid with the shaft 34 which clampingly receives a plurality of wire brush bristles 64 or the like which has their lower ends engaging the upper surface of the bottom plate 16 and capable of cleaning the opening 18 to assure that the opening 18 will be retained in an unclogged condition.

Disposed below the bottom plate 16 is a slide plate or gate 66 which underlies the bottom plate 16 and is slidably and sealing associated with the opening 18 with the side edges of the plate 16 including downturned and inwardly extending flanges 68 defining a guide track for the slide gate 66. The slide gate 66 is provided with an opening 70 alignable with the aperture 18 and also misalignable therewith to provide a valve for controlling discharge of material from the hopper. The outer end of the slide gate 66 is provided with downturned lugs 72 to which a flexible cable or line 74 is attached in any suitable manner with the flexible lines or cables being entrained over guide pulleys 76 or the like to enable the flexible cables to extend to a remote position for control of the slide gate 66. This is especially desirable when the dispenser is mounted on a tractor and chopper assembly in the field where the additive is to be added to the silage prior to its entry into the chopper or added to the silage as it leaves the chopper and is conveyed to a wagon box or other load units. The flexible cable 74 enables the operator of the tractor to open and close the gate 66 from his position on the operator's seat of the tractor. When the device is mounted in overlying relation to a conveyor leading to the blower alongside of a vertical silo or the like, the flexible cables or lines 74 may be omitted or may be provided if being more effective for controlling the position of the gate 66.

A limit may be provided for movement of the slide gate which may include a bolt type fastener 77 extending through the bottom plate 16 and the slide gate 66 and received in a slot in one of the members such as the stationary bottom plate 16 thus limiting the sliding movement of the slide plate 16 and retaining it assembled with respect to the bottom plate 16 which extends laterally beyond the hopper as illustrated in FIG. 3. When it is desired to control the rate of discharge, the slide gate 66 may be provided with a plurality of longitudinally spaced holes 78 for receiving a removable pin therethrough to limit the movement of the slide gate 66 so that the discharge apertures 70 therein may be only partially aligned with the opening 18 in the bottom plate 16 thereby providing a variation in the rate of discharge of material 12 from the hopper 14 as the shaft 34 is rotated.

The lugs 72 may be in the form of L-shaped members secured to the undersurface of the slide gate 66 and the number of apertures 78 may vary to position the gate 66 in intermediate positions with the slot and bolt structure 77 limiting the plate in its closed direction and in its full open direction. With the motor unit 46 actuated and the output speed thereof reduced through a conventional reduction gear assembly and the shaft 34 drivingly at a relatively slow speed and the gate 66 in a position to at least partially align the opening 70 with the opening 18 or fully align these two openings, a predetermined quantity of material will be discharged in a given time period with the discharge of the material being substantially continuous and uniform so that as the silage is being conveyed under the dispenser, a uniform quantity of additive will be added to the silage at a substantially uniform rate. The slide gate may be operated by the tractor operator or the person unloading a wagon box alongside of the wagon box adjacent a blower or the like thus enabling the device to be used at the silo or in the field with the chopper.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A dispenser for discharging a silage additive onto silage while being conveyed under the dispenser at a substantially uniform rate for discharging a predetermined quantity of additive uniformly to the silage, said dispenser comprising a substantially vertical hopper adapted to receive a quantity of pulverulent additive material, said hopper including a bottom plate having an opening therein, a slide gate having an aperture therein underlying the bottom plate with the slide gate being movable between a closed position and an open position with the aperture therein aligned with the opening in the bottom plate, an agitator shaft mounted in said hopper, means rotating the agitator shaft, and anticlogging means on the lower end of the agitator shaft for retaining the bottom plate and opening therein free of clogged material to retain the discharge rate from the dispenser substantially uniform.

2. A dispenser for discharging a silage additive onto silage while being conveyed under the dispenser at a substantially uniform rate for discharging a predetermined quantity of additive uniformly to the silage, said dispenser comprising substantially vertical hopper adapted to receive a quantity of pulverulent additive material, said hopper including a bottom plate having an opening therein, a slide gate having an aperture therein underlying the bottom plate with the slide gate being movable between a closed position and an open position with the aperture therein aligned with the opening in the bottom plate, an agitator shaft mounted in said hopper, means rotating the agitator shaft, and means on the lower end of the agitator shaft for retaining the bottom plate and opening therein free of clogged material to retain the discharge rate from the dispenser substantially uniform, said means on the lower end of said agitator shaft including a transversely extending and axially facing brush in engagement with the bottom plate.

3. The structure as defined in claim 2 wherein said brush includes a plurality of relatively stiff steel bristles.

4. The structure as defined in claim 3 wherein said agitator shaft includes a plurality of radially extending agitator rods, said rods being staggered vertically and circumferentially of the shaft for preventing the material from bridging across the hopper.

5. The structure as defined in claim 4 wherein said hopper is substantially conical in configuration with the terminal ends of the agitating rods disposed adjacent the inner surface thereof.

6. The structure as defined in claim 5 wherein said means for driving the shaft includes an electric motor and reduction gear unit drivingly connected with the agitator shaft to drive the agitator shaft at a relatively slow rotational speed.

7. The structure as defined in claim 6 wherein said slide gate includes at least one aperture therein for detachably receiving a limit pin to limit the movement of the slide gate to determine the portion of the aperture in the slide gate aligned with the opening in the bottom plate of the hopper for controlling the rate of discharge from the dispenser.

8. The structure as defined in claim 7 together with flexible control means connected with the slide gate and adapted to extend to a remote position for sliding the slide gate between its open and closed position from a remote point.

9. The structure as defined in claim 1 together with agitator means connected to said agitator shaft for agitating the pulverulent material within the hopper.

10. The structure as defined in claim 1 wherein said anticlogging means is slidably engaged with said bottom plate.

11. The structure as defined in claim 1 wherein said anticlogging means includes resilient means intermittently extending over and partially into said opening in the bottom plate for wiping the opening free when rotated by said rotating means.